United States Patent [19]

Shimanaka

[11] Patent Number: 5,060,541
[45] Date of Patent: Oct. 29, 1991

[54] SHIFT INITIATION DETECTION SYSTEM FOR AUTOMATIC AUTOMOTIVE TRANSMISSION

[75] Inventor: Shigeki Shimanaka, Hadano, Japan

[73] Assignee: Nissan Motor Co., Ltd., Yokohama City, Japan

[21] Appl. No.: 374,852

[22] Filed: Jul. 3, 1989

[30] Foreign Application Priority Data

Jul. 4, 1988 [JP] Japan ................................ 63-164870

[51] Int. Cl.⁵ ............................................ B60K 41/06
[52] U.S. Cl. .................................... 74/866; 364/424.1
[58] Field of Search ................. 74/866, 858, 859, 860; 364/424.1

[56] References Cited

U.S. PATENT DOCUMENTS

| | | | |
|---|---|---|---|
| 4,266,447 | 5/1981 | Heess et al. | 74/866 X |
| 4,551,802 | 11/1985 | Smyth | 364/424.1 |
| 4,559,599 | 12/1985 | Habu et al. | 364/424.1 |
| 4,680,988 | 7/1987 | Mori | 74/858 X |
| 4,744,031 | 5/1988 | Takeda et al. | 74/866 X |
| 4,793,216 | 12/1988 | Hiramatsu et al. | 74/866 |
| 4,800,781 | 1/1989 | Yasue et al. | 74/860 |

FOREIGN PATENT DOCUMENTS

| | | | |
|---|---|---|---|
| 55-69738 | 5/1980 | Japan . | |
| 59-175655 | 10/1984 | Japan | 74/860 |
| 2151727 | 7/1985 | United Kingdom | 74/858 |

OTHER PUBLICATIONS

Service Manual (Publication A261C07), Nissan Motor Co., Ltd., Mar. 1987.

Primary Examiner—Allan D. Herrmann
Assistant Examiner—Benjamin Levi
Attorney, Agent, or Firm—Foley & Lardner

[57] ABSTRACT

For a predetermined period following the issuance of a shift command signal, the output of a engine speed signal is temporarily ignored. Upon the expiration of the predetermined time, the engine speed is sampled and if the rate of change thereof is above a given value, the initiation of the shift operation is deemed to have occurred.

5 Claims, 4 Drawing Sheets

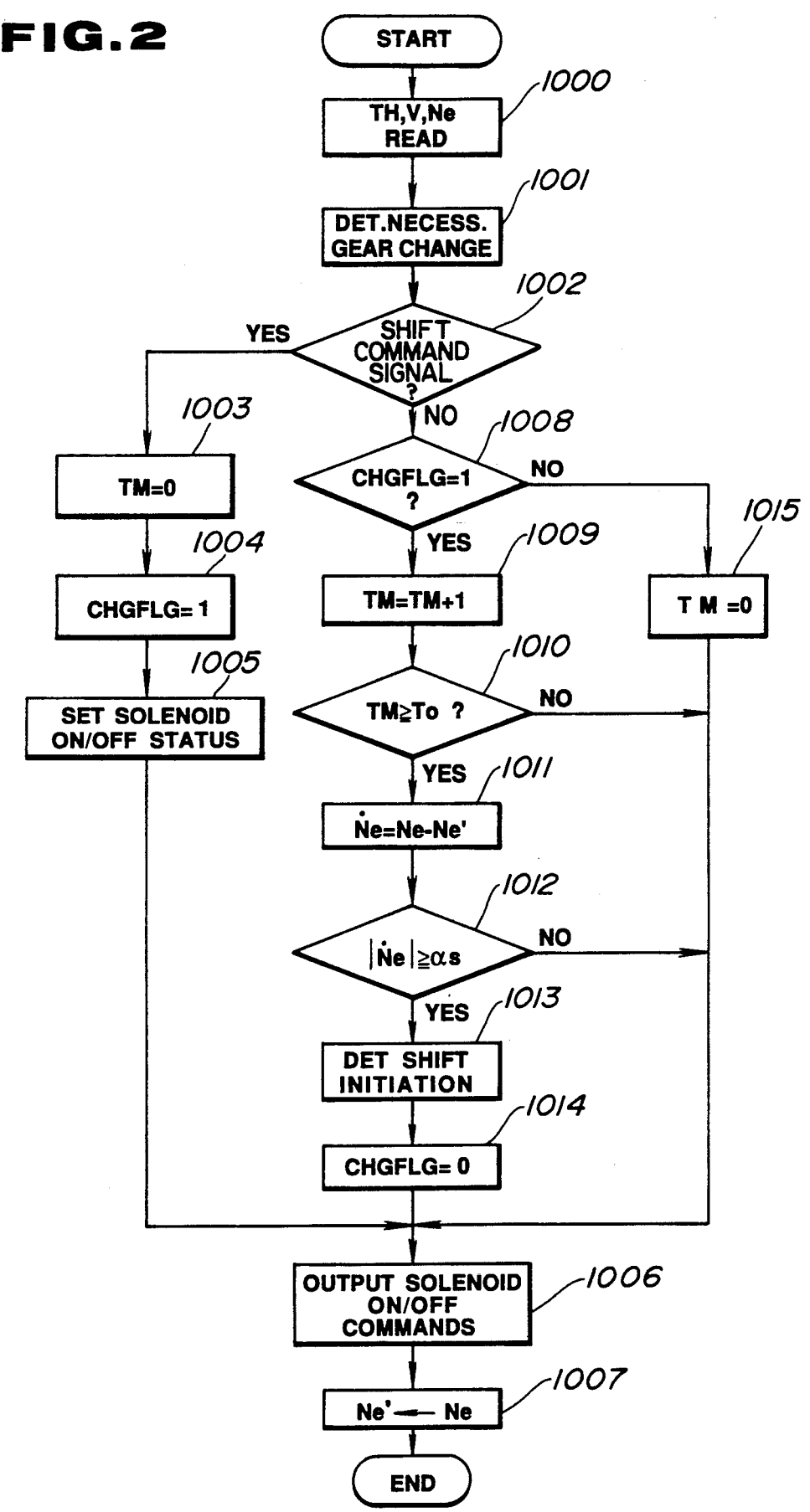

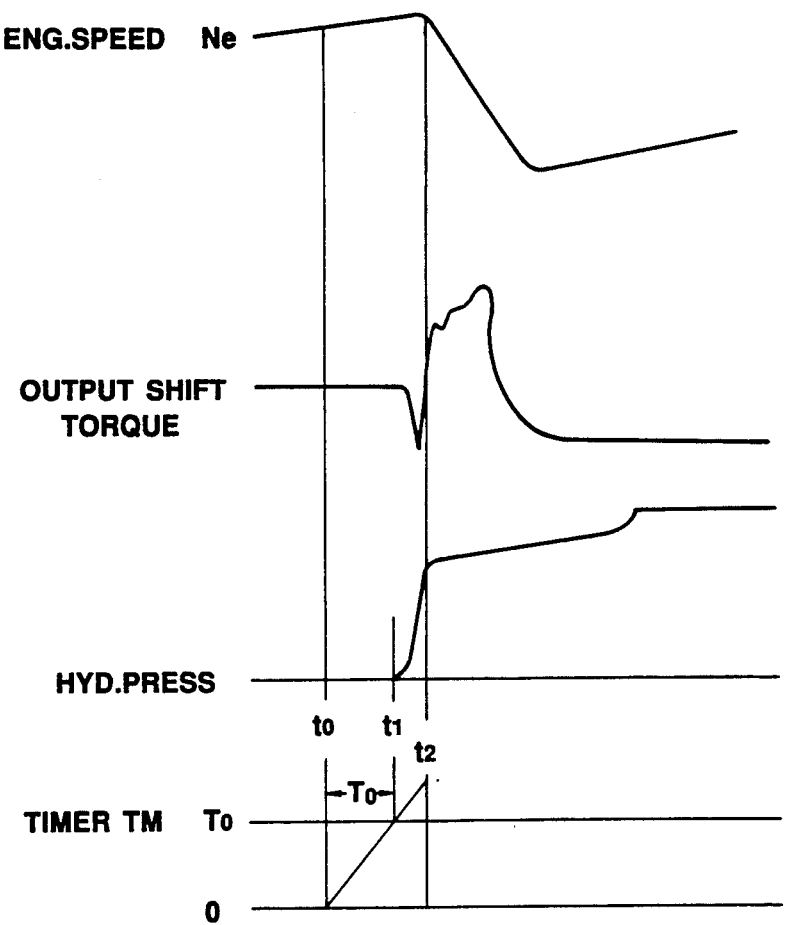

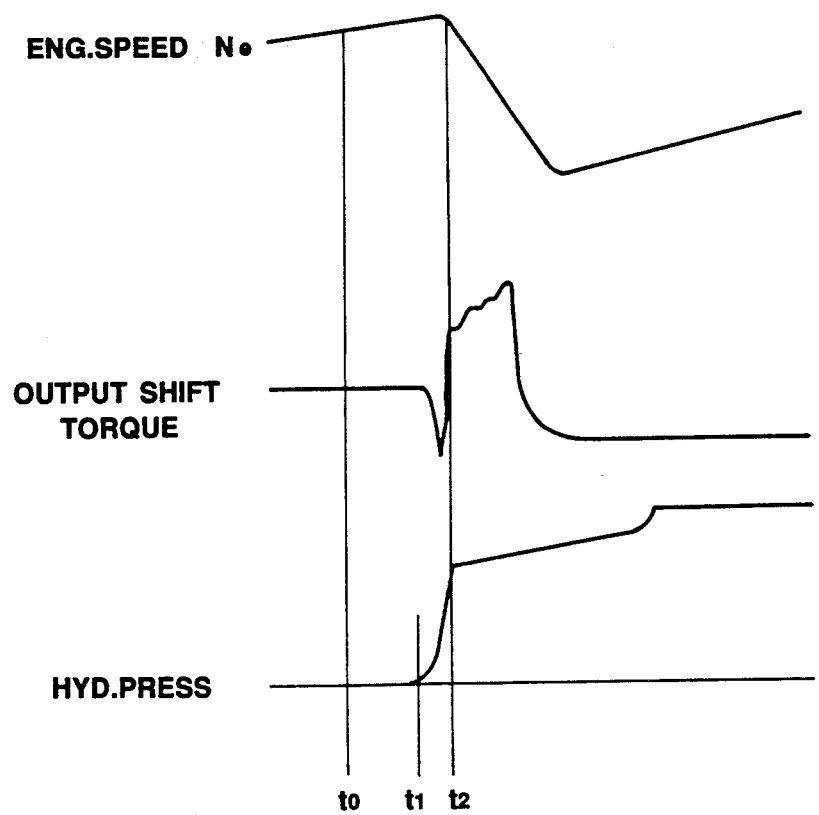

SHIFT INITIATION DETECTION SYSTEM FOR AUTOMATIC AUTOMOTIVE TRANSMISSION

BACKGROUND OF THE INVENTION

1. Field of the Invention

The present invention relates generally to automotive transmissions and more specifically to an arrangement for automatic transmissions which enables the beginning of a shift operation to be determined with accuracy.

2. Description of the Prior Art

Shifting between gears of a multi-forward speed type transmission is achieved by selectively supplying line pressure to a given friction element or elements.

In order to control the shifting it has been proposed to use two solenoid valves to the control the selective supply of line pressure to the friction elements. The decision as to which shift is necessary is based on the engine load and vehicle speed while the timing of the shift is based on the ratio of the transmission input shaft and output shaft rotational speeds.

However, during shifting a finite time is required from the time that a shift instruction signal is generated and the time the line pressure is actually supplied to the friction elements, and the shift is actually initiated. Accordingly, in order to obviate the detrimental effect of the delay between the issuance of the shift command and the actual implementation of the shift, on the control of the transmission, it is necessary to detect just when the shift actually begins to occur.

In this connection it has been proposed, by way of example, to control the amount of torque delivered to the transmission from the engine via the torque converter by controlling the amount of torque converter slip during shifts based on the shift initiation timing.

FIG. 4 is a timing chart which shows the relationship which develops between the engine rotational speed, the transmission output torque and the manner in which the friction element engaging line pressure develops.

As will be appreciated from this drawing, at time point t0 a shift command is issued, and at time t1 the spool valve arrangement responds to the command and the level of the hydraulic pressure which is fed to the friction element or elements for the given shift which begins to rise. At time t2 the pressure reaches a level whereat sufficient engagement of the friction elements is induced to permit power to be transmitted between the input and output shafts and thus marks the actual initiation of the shift operation. Immediately following time t2 the engine rotational speed Ne undergoes a marked change and the restrains the change in output torque.

JP-A-55-69738 discloses an example of an arrangement which seeks to determine the actual shift initiation following a shift command. In this arrangement the rate of change of the engine speed is monitored. When this rate exceeds a predetermined level, shift initiation is deemed to have occurred.

However, with this arrangement, it is necessary to constantly monitor the engine speed until the actual shift initiation. Viz., it is necessary to sample the engine speed during the period t0-t1 during which shift initiation does not occur. Due to the influence of noise, it sometimes happens that an incorrect determination of the engine speed occurs and leads to an improper determination of the shift initiation timing. This of course deteriorates the accuracy of any control which utilizes the timing of this event as a control parameter.

SUMMARY OF THE INVENTION

It is an object of the present invention to provide an arrangement which exhibits a reduced susceptibility to noise and is capable of assuredly detecting the point in time whereat the shift actually beings to occur.

In brief, the above object is achieved by a system wherein for a predetermined period following the issuance of a shift command signal, the output of an engine speed signal is temporarily ignored. Upon the expiration of the predetermined time, the engine speed is sampled and if the rate of change thereof is above a given value, the initiation of the shift operation is deemed to have occurred.

More specifically, a first aspect of the present invention is deemed to comprise a shift initiation detection arrangement for use in an automotive transmission, the transmission being operatively connected with an engine having an engine speed sensor, and including means for producing a shift command signal and which features a circuit responsive to the engine speed sensor and the shift command signal, the circuit including means for timing a predetermined period from the time the shift command signal is issued, ignoring the output of the engine speed sensor during the predetermined period, monitoring the engine speed following the expiration of the predetermined period and determining the rate of change of the engine speed, and determining the initiation of a shift upon the rate of change of the engine speed exceeding a predetermined level. A second aspect of the present invention is deemed to comprise a vehicle which features the combination of, an engine, an engine speed sensor, a transmission operatively connected with the engine, the transmission including friction elements which can be selectively engaged to produce different gears, transmission control means, the transmission control means including a control valve assembly which controls the delivery of hydraulic fluid to the friction elements and a circuit for issuing a shift command signal to the control valve assembly, a circuit responsive to the engine speed sensor and the shift command signal. The circuit including means for, timing a predetermined period from the time the shift command signal is issued, ignoring the output of the engine speed sensor during the predetermined period, monitoring the engine speed following the expiration of the predetermined period and determining the rate of change of the engine speed, and determining the initiation of a shift upon the rate of change of the engine speed exceeding a predetermined level.

A third aspect of the present invention is deemed to comprise a vehicle which features the combination of, an engine, an engine load sensor, an engine speed sensor, a transmission operatively connected with the engine, the transmission including friction elements which can be selectively engaged to produce different gears, a vehicle speed sensor, the vehicle speed sensor being operatively connected with the output shaft of the transmission, transmission control means, the transmission control means including a control valve assembly which controls the delivery of hydraulic fluid to the friction elements and a circuit for issuing a shift command signal to the control valve assembly, the shift command issuing circuit being responsive to the engine load sensor and the vehicle speed sensor, a circuit responsive to the engine speed sensor and the shift command signal. The circuit including means for, timing a predetermined period from the time the shift command signal is issued, ignoring the output of the engine speed sensor during the predetermined period, monitoring the engine speed following the expiration of the predetermined period and determining the rate of change of the engine speed, and determining the initiation of a shift upon the rate of change of the engine speed exceeding a predetermined level.

A fourth aspect of the present invention is deemed to comprise a transmission, the transmission being operatively connected with an engine having an engine load sensor and an engine speed sensor. The transmission featuring, friction elements which can be selectively engaged to produce different gears, a transmission output shaft rotational speed sensor for sensing the rotational speed of the output shaft and producing a vehicle speed signal, transmission control means, the transmission control means including a control valve assembly which controls the delivery of hydraulic fluid to the friction elements and a circuit for issuing a shift command signal to the control valve assembly, the shift command issuing circuit being responsive to the engine load sensor and the transmission output shaft rotational speed sensor, a circuit responsive to the engine speed sensor and the shift command signal, the circuit including means for, timing a predetermined period from the time the shift command signal is issued, monitoring the engine speed following the expiration of the predetermined period and determining the rate of change of the engine speed, and indicating the initiation of a shift upon the rate of change of the engine speed exceeding a predetermined level.

A fifth embodiment of the present invention is deemed to comprise a method of determining when a shift in a transmission actually begins to occur, the method featuring the steps of, sensing the engine speed of an engine which is operatively connected with the transmission; sensing the load on the engine, sensing the rotational speed of the output shaft and producing a vehicle speed signal, sensing the issuance of a shift command signal to a control valve assembly which controls the delivery of hydraulic fluid to friction elements of the transmission, timing a predetermined period from the time the shift command signal is issued, monitoring the engine speed following the expiration of the predetermined period and determining the rate of change of the engine speed, and indicating the initiation of a shift upon the rate of change of the engine speed exceeding a predetermined level.

BRIEF DESCRIPTION OF THE DRAWINGS

FIG. 2 is a flow chart depicting the operations which characterize the operation of the present invention;

FIGS. 3 and 4 are timing charts which show, in terms of engine speed, output torque and hydraulic pressure, the characteristics which are provided with the present invention and those which were discussed in the opening characteristics of the instant disclosure respectively.

DETAILED DESCRIPTION OF THE PREFERRED EMBODIMENTS

Figure 1:
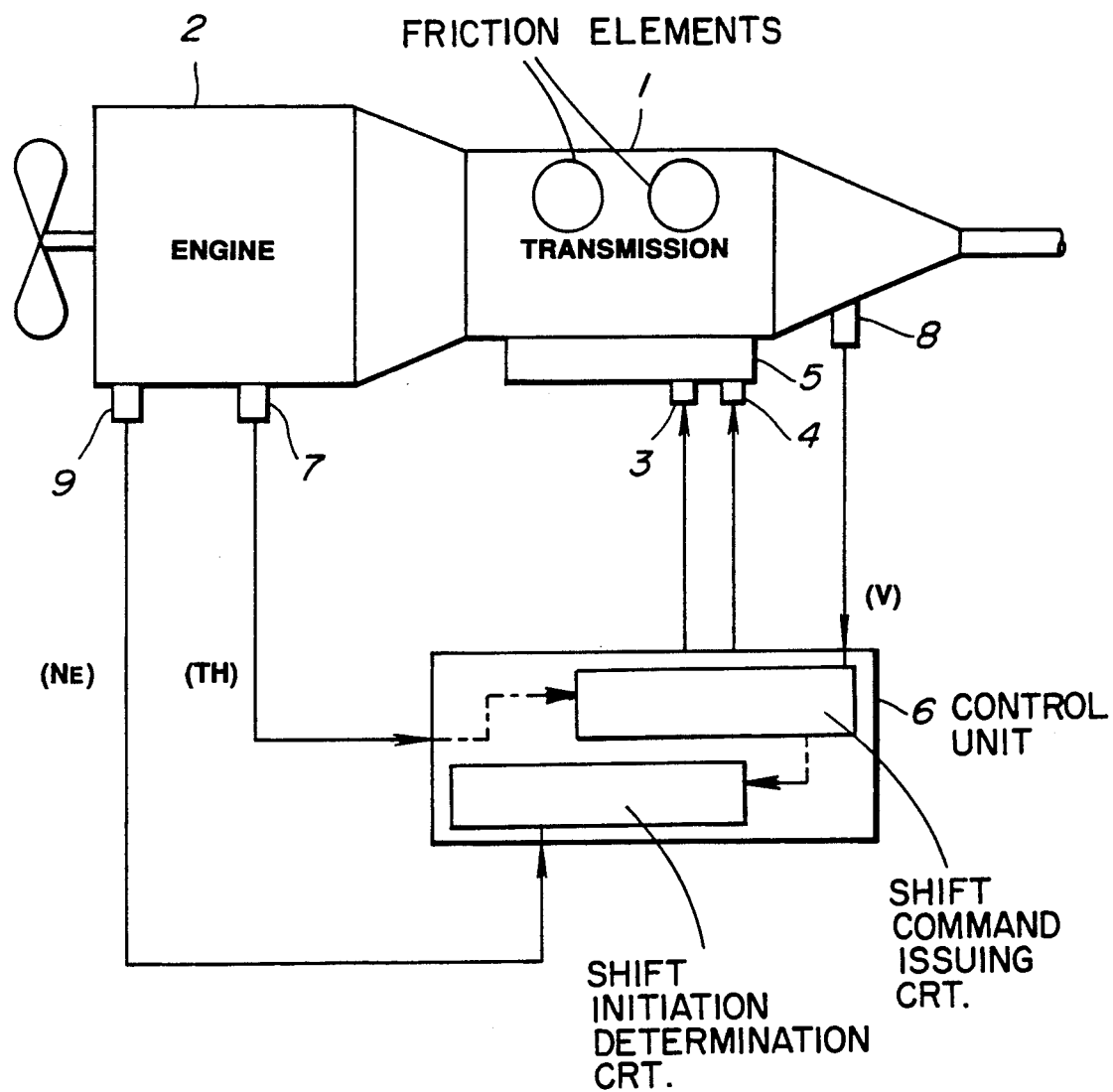
FIG. 1 is a schematic view showing an engine and transmission arrangement to which an embodiment of the present invention is applied.

FIG. 1 shows a system which embodies the present invention. In this arrangement an automatic transmission 1 of the so called RE4RO1A type described in Service Manual (publication A261C07) issued in March 1987 by the Nissan Motor Company, is operatively connected with an electronic fuel injected internal combustion engine 2, by way of a torque converter (no numeral). First and second shift solenoids 3 and 4 are operatively connected with a control valve assembly 5. In accordance with the selective energization of the shift solenoids 3 and 4 (shown in the table below), line pressure is supplied to the friction elements of the transmission in a manner to selective produced first to fourth forward speeds.

TABLE

| GEAR: | FIRST: | SECOND: | THIRD: | FOURTH: |
|---|---|---|---|---|
| SOL. 3: | ON | OFF | OFF | ON |
| SOL. 4: | ON | ON | OFF | OFF |

A control unit 6 which includes a microprocessor is arranged to receive data input from a engine throttle position sensor 7 and a vehicle speed sensor 8 and an engine speed sensor 9. Using this data the control unit 6 determines which gear the transmission should be conditioned to produce and determines the appropriate energization pattern for the shift solenoids 3,4.

FIG. 2 shows in flow chart form a routine which is run in the microprocessor in accordance with the present invention. In step 1000 of this routine the outputs of the throttle position, vehicle speed and engine speed sensors 7, 8 and 9 are sampled and the values TH, V and Ne are set in memory ready for processing in the instant run. At step 1001 the values of TH and V are used to determine from shift maps which are recorded in terms of engine load and vehicle speed, which gear the transmission should be conditioned to produce under the instant set of engine load and vehicle speed conditions. At step 1002 it is determined if the gear which is indicated as being necessary in step 1001 is in fact being used and if a shaft command signal is being generated or not. If presence of a shift command signal (yes), the routine flows to step 1003 wherein soft timer TM is cleared. At step 1004 a shift flag CHGFLG is set=1 and at step 1005 the appropriate setting of the solenoids 3 and 4 are determined in accordance with the outcome of step 1001.

Although the instant invention is not necessarily limited to use with such systems, examples of arrangements via which the determinations of which solenoid should be energized and/or de-energized reference can be had to the copending applications which are incorporated by reference at the end of this specification.

At step 1006 commands are issued which produce the desired solenoid energizations and at step 1007 the instant engine speed valve Ne is set in memory as a value Ne'. This value is used for calculation purposes according to the present invention as will become more apparent later.

In the event a shift command signal is found to be absent in step 1002 (no), the routine flows to step 1008 wherein the status of the flag CHGFLG is checked. If the current status of the flag is 0 then the routine flows across to step 1015 while in the event that it has been set, the routine flows to step 1009 wherein the count of the timer TM is incrementally increased. At step 1010 it is determined if the count of the timer has reached and-/or exceeded a predetermined count. Until this count is reached the routine flows directly to step 1006.

When the count reaches and/or exceeds the predetermined value To, the routine is directed to flow to step 1011 wherein the rate of change of engine speed is derived. This is done by determining the difference between the instant Ne value and the Ne' value (which represents the engine speed as sampled on the previous run). As the instant routine is run at predetermined intervals (e.g. 10ms intervals) the difference is inherently representative of the rate of change. At step 1012 the absolute valve of Ṅe is compared with a predetermined value $\alpha s$. In the event that $|\dot{N}e|$ is $< \alpha s$ then the routine flows to step 1006. However, upon the $|\dot{N}e| \geq \alpha s$ requirement being met, then the routine flows to steps 1013, 1014 wherein a shift initiation is determined to have occurred and flag CHGFLG is cleared.

Accordingly, during the period following an issuance of the shift signal command, the engine rotational speed monitoring is delayed (not conducted) and therefore the effect of noise and the like is prevented from causing an erroneous determination of the time at which the shift initiation actually occurs. The accuracy with which such a determination can be made is therefore increased.

The disclosure of the following documents are incorporated by reference thereto.

1. USN 07/330,129, now U.S. Pat. No. 4,970,916, filed on Mar. 29, 1989 in the name of Narita;
2. USN 07/347,636, now U.S. Pat. No. 4,939,957, filed on May 5 1989 in the name of Asono et al (claiming priority based on Japanese Patent Application No. P63-109101);
3. USN 07/336,430 now U.S. Pat. No. 4,972,738 filed on Apr. 11, 1989 in the name of Narita (claiming priority based on Japanese Patent Application No. P63-87389); or
4. USN 07/337,869, now U.S. Pat. No. 4,955,259 filed on Apr. 14, 1989 in the name of Narita (claiming priority based on Japanese Patent Application No. P63-91813).

What is claimed is:

1. A shift initiation detection arrangement for use in an automotive transmission, the transmission being operatively connected with an engine having an engine speed sensor, and including means for producing a shift command signal, comprising:
    a circuit responsive to the engine speed sensor and the shift command signal, the circuit including means for:
    timing a predetermined period from a time the shift command signal is issued;
    ignoring an output of said engine speed sensor during the predetermined period;
    monitoring engine speed following an expiration of the predetermined period and determining a rate of change of the engine speed; and
    determining a shift initiation upon the rate of change of the engine speed exceeding a predetermined level.

2. In a vehicle,:
    an engine;
    an engine speed sensor;
    a transmission operatively connected with the engine, the transmission including friction elements which can be selectively engaged to produce different gears;
    transmission control means, said transmission control means including a control valve assembly which controls the delivery of hydraulic fluid to the friction elements and a control unit for issuing a shift command signal to said control valve assembly, said control unit being responsive to the engine speed sensor and the shift command signal, said control unit including means for:
    timing a predetermined period from a time the shift command signal is issued;
    ignoring an output of said engine speed sensor during the predetermined period;
    monitoring engine speed following an expiration of said predetermined period and determining a rate of change of the engine speed; and
    determining a shift initiation upon the rate of change of engine speed exceeding a predetermined level.

3. In a vehicle,:
    an engine;
    an engine load sensor;
    an engine speed sensor;
    a transmission operatively connected with said engine, said transmission including friction elements which can be selectively engaged to produce different gears, said transmission having an output shaft;
    a vehicle speed sensor, said vehicle speed sensor being operatively connected with the output shaft of said transmission;
    transmission control means, said transmission control means including a control valve assembly which controls the delivery of hydraulic fluid to said friction elements and a control unit for issuing a shift command signal to the control valve assembly, the control unit being responsive to said engine load sensor and said vehicle speed sensor, said control unit including means for:
    timing a predetermined period from a time the shift command signal is issued;
    ignoring an output of said engine speed sensor during the predetermined period;
    monitoring engine speed following an expiration of the predetermined period and determining a rate of change of the engine speed; and
    determining a shift initiation upon the rate of change of the engine speed exceeding a predetermined level.

4. A transmission, said transmission being operatively connected with an engine having an engine load sensor and an engine speed sensor, and comprising:
    friction elements which can be selectively engaged to produce different gears;
    a transmission output shaft rotational speed sensor for sensing the rotational speed of an output shaft and producing a vehicle speed signal;
    transmission control means, said transmission control means including a control valve assembly which controls the delivery of hydraulic fluid to said friction elements and a control unit for issuing a shift command signal to the control valve assembly, the control unit being responsive to the engine load sensor and said transmission output shaft rotational speed sensor and said control unit including means for:
    timing a predetermined period from the time said shift command signal is issued;
    monitoring engine speed following an expiration of the predetermined period and determining a rate of change of the engine speed; and
    indicating a shift initiation upon the rate of change of engine speed exceeding a predetermined level.

5. A method of determining when a shift in a transmission actually begins to occur comprising the steps of:

sensing an engine speed of an engine which is operatively connected with the transmission;

sensing a load on the engine;

sensing a rotational speed of a transmission output shaft and producing a vehicle sped signal;

sensing an issuance of a shift command signal to a control valve assembly which controls the delivery of hydraulic fluid to friction elements of the transmission;

timing a predetermined period from a time the shift command signal is issued;

monitoring engine speed following an expiration of said predetermined period and determining a rate of change of the engine speed; and indicating a shift initiation upon the rate of change of the engine speed exceeding a predetermined level.

* * * * *